(12) United States Patent
Chen

(10) Patent No.: US 12,474,465 B2
(45) Date of Patent: Nov. 18, 2025

(54) POSITIONING METHOD, GATEWAY, AND POSITIONING DEVICE

(71) Applicant: ZTE CORPORATION, Shenzhen (CN)

(72) Inventor: Chunlei Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 328 days.

(21) Appl. No.: 18/278,023

(22) PCT Filed: Feb. 23, 2022

(86) PCT No.: PCT/CN2022/077471
§ 371 (c)(1),
(2) Date: Aug. 21, 2023

(87) PCT Pub. No.: WO2022/179526
PCT Pub. Date: Sep. 1, 2022

(65) Prior Publication Data
US 2024/0319360 A1    Sep. 26, 2024

(30) Foreign Application Priority Data

Feb. 25, 2021   (CN) .......................... 202110215123.7

(51) Int. Cl.
*G01S 13/76* (2006.01)
(52) U.S. Cl.
CPC .................. *G01S 13/765* (2013.01)
(58) Field of Classification Search
CPC .................................. G01S 13/765
See application file for complete search history.

(56) References Cited

U.S. PATENT DOCUMENTS

| 10,976,403 B2 | 4/2021 | Nishimura |
| 2019/0302216 A1 | 10/2019 | Hulvey |

(Continued)

FOREIGN PATENT DOCUMENTS

| CN | 104703118 A | 6/2015 |
| CN | 108282747 A | 7/2018 |

(Continued)

OTHER PUBLICATIONS (ISA/237) Written Opinion of the International Searching Authority dated Apr. 26, 2022.

(Continued)

*Primary Examiner* — David Bilodeau
(74) *Attorney, Agent, or Firm* — NZ Carr Law Office

(57) ABSTRACT

Disclosed are a positioning method, a gateway, and a positioning device. The positioning method comprises: receiving, by means of a Bluetooth gateway, a data packet sent by a terminal device and comprising target position information, and position information of a Bluetooth node closest to the terminal device; determining the closest Bluetooth node according to the position information of the closest Bluetooth node; receiving, by the closest Bluetooth node, a data packet sent by the terminal device and comprising CTE information; obtaining current position information of the terminal device according to the CTE information; and when the current position information of the terminal device is inconsistent with the target position information, obtaining, according to the current position information of the terminal device and the target position information, position information of a next Bluetooth node closest to the terminal device and navigation information, and sending the navigation information to the terminal device.

16 Claims, 5 Drawing Sheets

(56) References Cited

U.S. PATENT DOCUMENTS

| | | | |
|---|---|---|---|
| 2020/0113006 A1 | 4/2020 | Bloechl et al. | |
| 2020/0382900 A1* | 12/2020 | Suzuki | H04W 4/029 |
| 2021/0021962 A1 | 1/2021 | Diaz Fuente | |
| 2024/0077873 A1* | 3/2024 | Pannala | G05D 1/0257 |
| 2024/0251363 A1* | 7/2024 | Liu | H04W 48/10 |

FOREIGN PATENT DOCUMENTS

| | | |
|---|---|---|
| CN | 109803225 A | 5/2019 |
| CN | 112312315 A | 2/2021 |
| JP | 2002-049538 A | 2/2002 |
| JP | 2002-217813 A | 8/2002 |
| JP | 2008-087102 A | 4/2008 |
| KR | 100738927 B1 | 7/2007 |

OTHER PUBLICATIONS

The international search report of the corresponding PCT Application No. PCT/CN2022/077471 mailed on Apr. 26, 2022 along with English translation thereof.

Savolainen M:"Bluetooth 5.1 Introduces 1-14 Sub Meter Positioning", Feb. 28, 2019 (Feb. 28, 2019), XP055843909 Retrieved from the Internet: URL:chrome-extension://efaidnbmnn-nibpcajpcglclefindmkaj /https://www.silabs.com/documents/public/presentations/ew-2019-bluetooth-direction-finding-bluetooth-5-1-feature.pdf [retrieved on Sep. 22, 2021] p. 7-p. 9*.

Bluetooth:"Bluetooth Core Specification v5.1 Feature Overview", Jan. 28, 2019 (Jan. 28, 2019), XP055734042, Retrieved from the Internet: URL:https://www.bluetooth.com/wp-content/uploads/2019/03/1901_Feature_Overview_Brief_FINAL.pdf [retrieved on Sep. 25, 2020] * p. 4-p. 5; figures 1-2 *.

Lin You-Wei et al:"An Interactive Real-Time Locating System Based on Bluetooth Low-Energy Beacon Network +", Sensors, vol. 18, No. 5, May 21, 2018 (May 21, 2018), p. 1637, XP093233333 CH ISSN: 1424-8220, DOI:10.3390/s18051637 *p. 5-p. 15; figures 1,2,7,12*.

EESR of the corresponding EP Patent Application No. 22758890.2 dated Jan. 21, 2025.

Decision of patent dated Jul. 30, 2024 in connection with Japanese patent application No. 2023-550129.

\* cited by examiner

POSITIONING METHOD, GATEWAY, AND POSITIONING DEVICE

CROSS REFERENCE TO RELATED APPLICATIONS

This application is based upon and claims priority to Chinese Patent Application No. 202110215123.7, filed on Feb. 25, 2021, the entire contents of which are incorporated herein by reference.

TECHNICAL FIELD

Embodiments of the present application relate to the technical field of positioning, in particular to a positioning method, a gateway and a positioning device.

BACKGROUND

At present, mainstream indoor positioning and position finding technologies include WiFi indoor positioning technology, ultra wide band (UWB) indoor positioning technology, RFID indoor positioning technology and Bluetooth indoor positioning technology, and these technologies each have their own advantages and disadvantages. Generally, the finer the positioning, the more difficult the cost and deployment. Among them, Bluetooth positioning technology mostly realizes positioning by received signal strength information.

However, this approach relies on the transmission of received signal strength packets, is prone to interference from the outside environment, especially in indoor environments where there are many obstacles, signals propagating in limited space are prone to multiple reflections and refractions, which affects the positioning accuracy and is also limited by the transmission distance of Bluetooth.

SUMMARY

An embodiment of the present application provides a positioning method, applied to a Bluetooth node in a Bluetooth mesh network, wherein the Bluetooth mesh network includes a Bluetooth gateway and at least two of the Bluetooth nodes, the Bluetooth node stores position information of all Bluetooth nodes and information of distance between the Bluetooth nodes, and the method includes: receiving, by means of a Bluetooth gateway, a data packet sent by a terminal device and including target position information, and position information of a Bluetooth node closest to the terminal device; determining the closest Bluetooth node according to the position information of the Bluetooth node closest to the terminal device; receiving, by the closest Bluetooth node, a data packet sent by the terminal device and including constant tone extension (CTE) information; obtaining current position information of the terminal device according to the CTE information; and obtaining, according to the current position information of the terminal device and the target position information, position information of a next Bluetooth node closest to the terminal device and navigation information, and sending the navigation information to the terminal device when the current position information of the terminal device is inconsistent with the target position information.

An embodiment of the present application further provides a positioning method, applied to a terminal device in a Bluetooth mesh network, wherein the Bluetooth mesh network includes a Bluetooth gateway and at least two Bluetooth nodes, the Bluetooth nodes store position information of all Bluetooth nodes and information of distance between Bluetooth nodes, and the method includes: obtaining position information of a Bluetooth node closest to the terminal device; sending, by means of the Bluetooth gateway, a data packet including target position information and the position information of the closest Bluetooth node to each Bluetooth node; sending, by means of the Bluetooth gateway, a data packet including constant tone extension (CTE) information to the closest Bluetooth node for the Bluetooth node to obtain navigation information and send the navigation information to the terminal device when a distance between the terminal device and the closest Bluetooth node is less than a preset threshold; and receiving, by means of the Bluetooth gateway, the navigation information sent by the closest Bluetooth node.

An embodiment of the present application further provides a Bluetooth gateway, wherein the Bluetooth gateway is located in a Bluetooth mesh network, and the Bluetooth mesh network includes at least two Bluetooth nodes; the Bluetooth gateway is configured to receive a data packet sent by a terminal device and including target position information, position information of a closest Bluetooth node and a data packet including constant tone extension (CTE) information, and receive navigation information sent by the Bluetooth node; the Bluetooth gateway is further configured to send a data packet including target position information, position information of a closest Bluetooth node and a data packet including constant tone extension (CTE) information to the Bluetooth node, and send navigation information to the terminal device.

An embodiment of the present application further provides a positioning device, wherein the positioning device is located in a Bluetooth mesh network, positioning devices communicate with each other through broadcast packets or data packets, and the positioning device includes: a Bluetooth module, configured to receive a data packet sent by a terminal device and including target position information, position information of a closest Bluetooth node and a data packet including constant tone extension (CTE) information; and a processing module, configured to obtain current position information of the terminal device according to the CTE information, and obtain, according to the current position information of the terminal device and the target position information, position information of a next Bluetooth node closest to the terminal device and navigation information, and send the navigation information to the terminal device when the current position information of the terminal device is inconsistent with the target position information.

BRIEF DESCRIPTION OF THE DRAWINGS

One or more embodiments are exemplarily described by pictures in the corresponding drawings, and these exemplary descriptions do not constitute limitations on the embodiments.

DETAILED DESCRIPTION

In order to make the objectives, technical solutions and advantages of the embodiments of the present application clearer, various embodiments of the present application will be described in detail below in conjunction with the drawings. However, a person having ordinary skill in the art may appreciate that numerous technical details are set forth in various embodiments of the present application in order that readers better understand the present application. However, the technical solutions claimed in the present application may be implemented without these technical details and various variations and modifications based on the following embodiments. The following embodiments are divided for the convenience of description, and should not constitute any limitation on the specific implementation of the present application. The embodiments may be combined with each other and cited without contradiction.

A main objective of the embodiments of the invention is to provide a positioning method, a gateway and a positioning device, to realize high-precision long-distance positioning.

According to the positioning method provided by the present disclosure, the Bluetooth node in the Bluetooth mesh network determines the Bluetooth node closest to the terminal device by receiving the data packet sent by the terminal device and including the target position information and the position information of the Bluetooth node closest to the terminal device, and the closest Bluetooth node determines the current position information of the terminal device according to the CTE information in the moving process of the terminal device, and continuously searches for the next Bluetooth node closest to the terminal device and obtains navigation information until the current position information of the terminal device is consistent with the target position information, thereby expanding the coverage of Bluetooth, improving the positioning accuracy and realizing long-distance positioning.

The positioning method of the present application is applied to a Bluetooth mesh network, so that a plurality of positioning devices need to be arranged indoors or within a limited space in advance, and the specific number and positions of the positioning devices need to be determined according to actual situation when the positioning devices are deployed. For example, when the positioning devices are arranged in an indoor parking lot, Bluetooth nodes should be deployed according to the distribution of parking spaces, and when the positioning devices are arranged in a hospital, Bluetooth nodes should be deployed according to the distribution of departments. The whole network is of a mesh structure, and the distance between the positioning devices may be the same or different.

Figure 1:
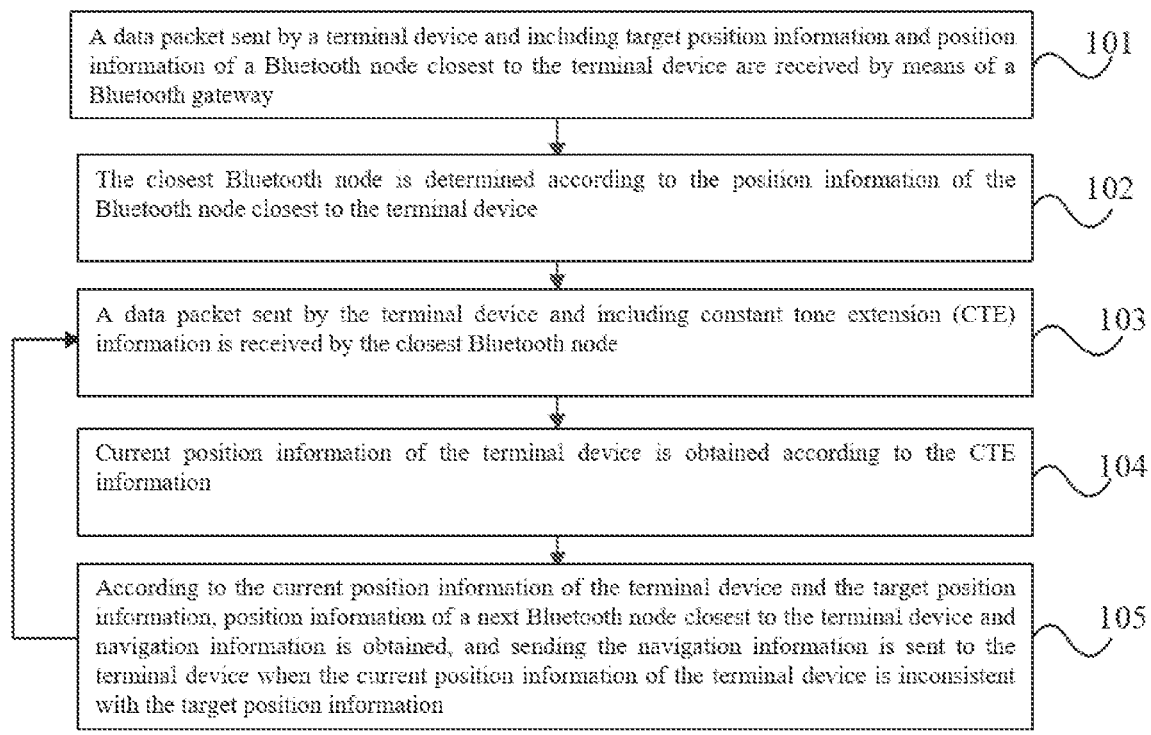
FIG. 1 is a flowchart of a positioning method provided by a first embodiment of the present application.

A first embodiment of the present application relates to a positioning method, applied to a Bluetooth node in a Bluetooth mesh network, wherein the Bluetooth mesh network includes a Bluetooth gateway and at least two of the Bluetooth nodes, the Bluetooth node stores position information of all Bluetooth nodes and information of distance between the Bluetooth nodes, and as shown in FIG. 1, the positioning method specifically includes:

At operation 101, a data packet sent by a terminal device and including target position information and position information of a Bluetooth node closest to the terminal device are received by means of a Bluetooth gateway.

In the embodiment, the Bluetooth nodes in the Bluetooth mesh network communicate with the terminal device by means of the Bluetooth gateway, and the Bluetooth nodes can directly transmit data packets or broadcast packets to each other, and one Bluetooth node will pre-store position information of all the remaining Bluetooth nodes and information of distance between the Bluetooth node and all the remaining Bluetooth nodes. The position information of the closest Bluetooth node may include an MAC address of the Bluetooth node and the distance from the closest Bluetooth node to the terminal device. The MAC address of the Bluetooth node is configured to identify the Bluetooth node.

It should be noted that in practical application, a user usually only knows the name or logo of the target position, but does not have a clear idea of the specific distance and direction information. Therefore, the target position information obtained by the Bluetooth node in operation 101 is the name input by the user in the terminal device, and the terminal device or the Bluetooth node processes the name and converts the processed name into the position information, such as the MAC address of the Bluetooth node, of the Bluetooth node in the Bluetooth mesh network.

In addition, in the process of practical application, the Bluetooth node may be a device or apparatus including a Bluetooth module, and the Bluetooth module may be a common Bluetooth module or a low-energy-consumption Bluetooth module.

At operation 102, the closest Bluetooth node is determined according to the position information of the Bluetooth node closest to the terminal device.

In the embodiment, the position information of the Bluetooth node closest to the user terminal is obtained by the terminal device, and the closest Bluetooth node itself does not know that it is closest to the user terminal, and therefore, the Bluetooth node needs to receive the position information of the closest Bluetooth node for confirmation.

At operation 103, a data packet sent by the terminal device and including constant tone extension (CTE) information is received by the closest Bluetooth node.

At operation 104, current position information of the terminal device is obtained according to the CTE information.

In the embodiment, before receiving the data packet sent by the terminal device and including the CTE information, the closest Bluetooth node would firstly initiate an LL_CT_REQ PDU packet, requesting the terminal device to send a data packet including the CTE information, then the Bluetooth node will adopt the angle of arrival (AOA) positioning method after receiving the CTE information, and the whole process follows the standard of Bluetooth 5.1 and related protocols.

It should be noted that the LL_CTE_REQ PDU data packet may include both AOA-type CTE information and angle of departure (AOD)-type CTE information. If the LL_CTE_REQ PDU data packet includes an AOA-type CTE, a sending end does not need to perform antenna switching, and a receiving end obtains an angle of arrival by an antenna switching method. If the LL_CTE_REQ PDU data packet includes a DOA-type CTE, the sending end needs to perform antenna switching, and the receiving end can obtain an angle of departure without antenna switching.

In addition, it should be noted that in this embodiment, only one antenna is needed for Bluetooth in the terminal device, while an array of antennas is needed for the Bluetooth module in the positioning device at the Bluetooth node, preferably five antennas, and the five antennas are arranged in a cross shape. Of course, in actual use, the number and arrangement of the antennas may vary depending on the circumstances.

At operation 105, according to the current position information of the terminal device and the target position information, position information of a next Bluetooth node closest to the terminal device and navigation information is obtained, and the navigation information is sent to the terminal device when the current position information of the terminal device is inconsistent with the target position information.

In the embodiment, in the whole process, the terminal device is in a moving state, that is, the whole positioning process adopts real-time positioning. The Bluetooth node closest to the terminal device (the first closest Bluetooth node) obtains the current position information of the terminal, when the current position information of the terminal is inconsistent with the target position information, the information of the next Bluetooth node closest to the terminal device (the second closest Bluetooth node) and navigation information are determined according to the current position information of the terminal device and the target position information, the terminal moves towards the next closest Bluetooth node according to the navigation information, the above operations of receiving a data packet including CTE information, and obtaining current position information of the terminal, the third closest Bluetooth node and navigation information are also performed for the second closest Bluetooth node, and the operation is repeated in this way until the current position information of the terminal is consistent with the target position information.

It should be noted that the navigation information includes information of distance and information of orientation between the current position of the terminal device and the next Bluetooth node closest to the terminal device.

According to the positioning method provided by the embodiment, the Bluetooth node in the Bluetooth mesh network determines the Bluetooth node closest to the terminal device by receiving the data packet sent by the terminal device and including the target position information and the position information of the Bluetooth node closest to the terminal device, and the closest Bluetooth node determines the current position information of the terminal device according to the CTE information during the movement of the terminal device, and continuously searches for the next Bluetooth node closest to the terminal device and obtains navigation information until the current position information of the terminal device is consistent with the target position information, thereby expanding the coverage of Bluetooth, improving the positioning accuracy and realizing long-distance positioning.

Figure 2:
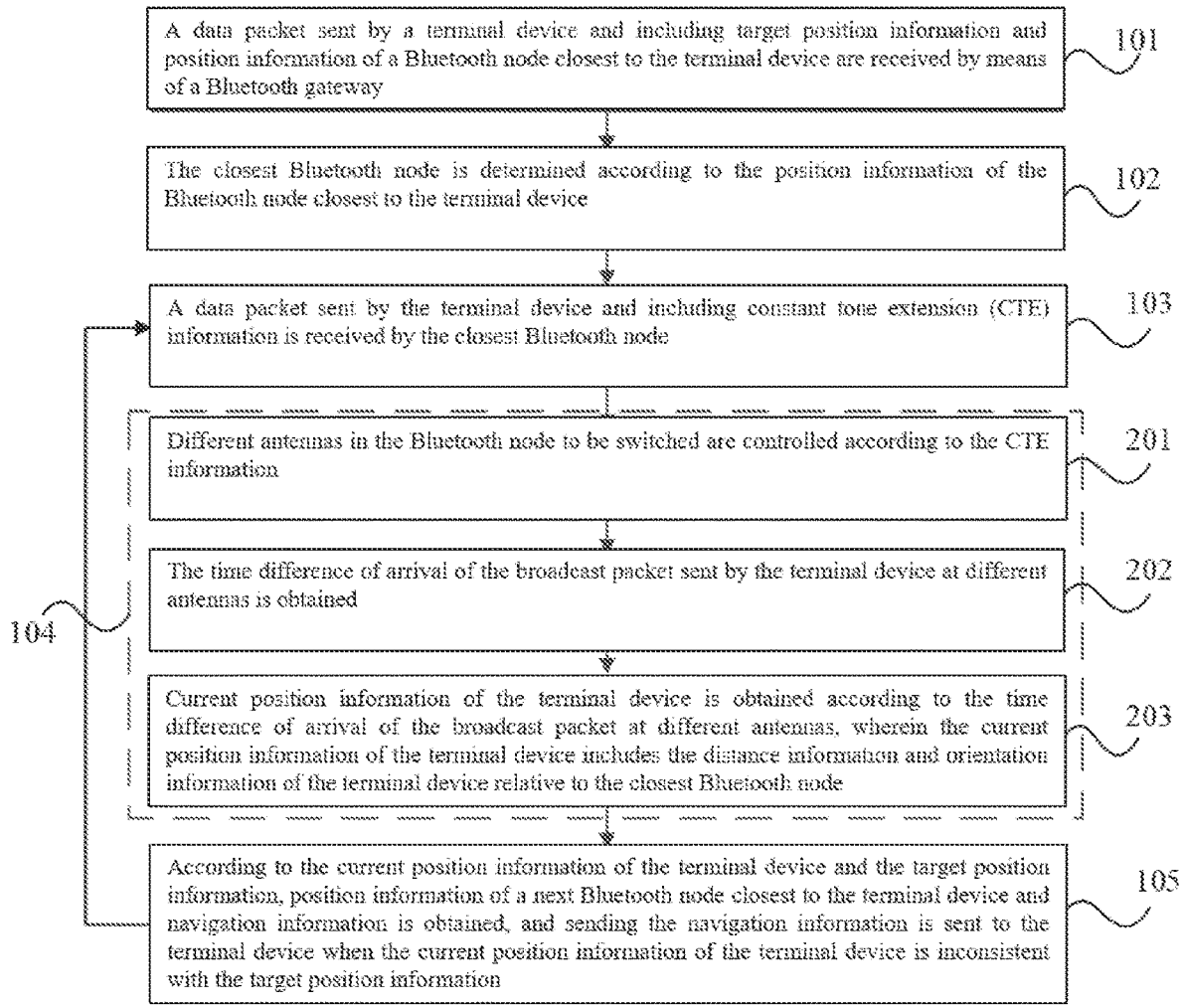
FIG. 2 is a flowchart of a positioning method provided by a second embodiment of the present application.

A second embodiment of the present application relates to a positioning method, which is substantially the same as the first embodiment, with the difference that, specifically, as shown in FIG. 2, operation 104 includes:

At operation 201, different antennas in the Bluetooth node to be switched are controlled according to the CTE information.

In the embodiment, the CTE information includes an antenna switching time slot, a signal sampling time slot, and information of an included angle between the terminal device and the antennas of the Bluetooth node. Each antenna can be controlled to be turned on or off according to the CTE information, so as to obtain the time difference of arrival of the packet at different antennas.

At operation 202, the time difference of arrival of the broadcast packet sent by the terminal device at different antennas is obtained.

At operation 203, current position information of the terminal device is obtained according to the time difference of arrival of the broadcast packet at different antennas, wherein the current position information of the terminal device includes the distance information and orientation information of the terminal device relative to the closest Bluetooth node.

According to the positioning method of the embodiment, on the basis of the first embodiment, the closest Bluetooth node controls different antennas to be switched according to the CTE information, and can accurately obtain the time difference of arrival of the broadcast packet sent by the terminal device at different antennas, thereby accurately obtaining the current position information of the terminal device, so that the subsequently determined position information of the next Bluetooth node closest to the terminal device is more accurate.

Figure 3:
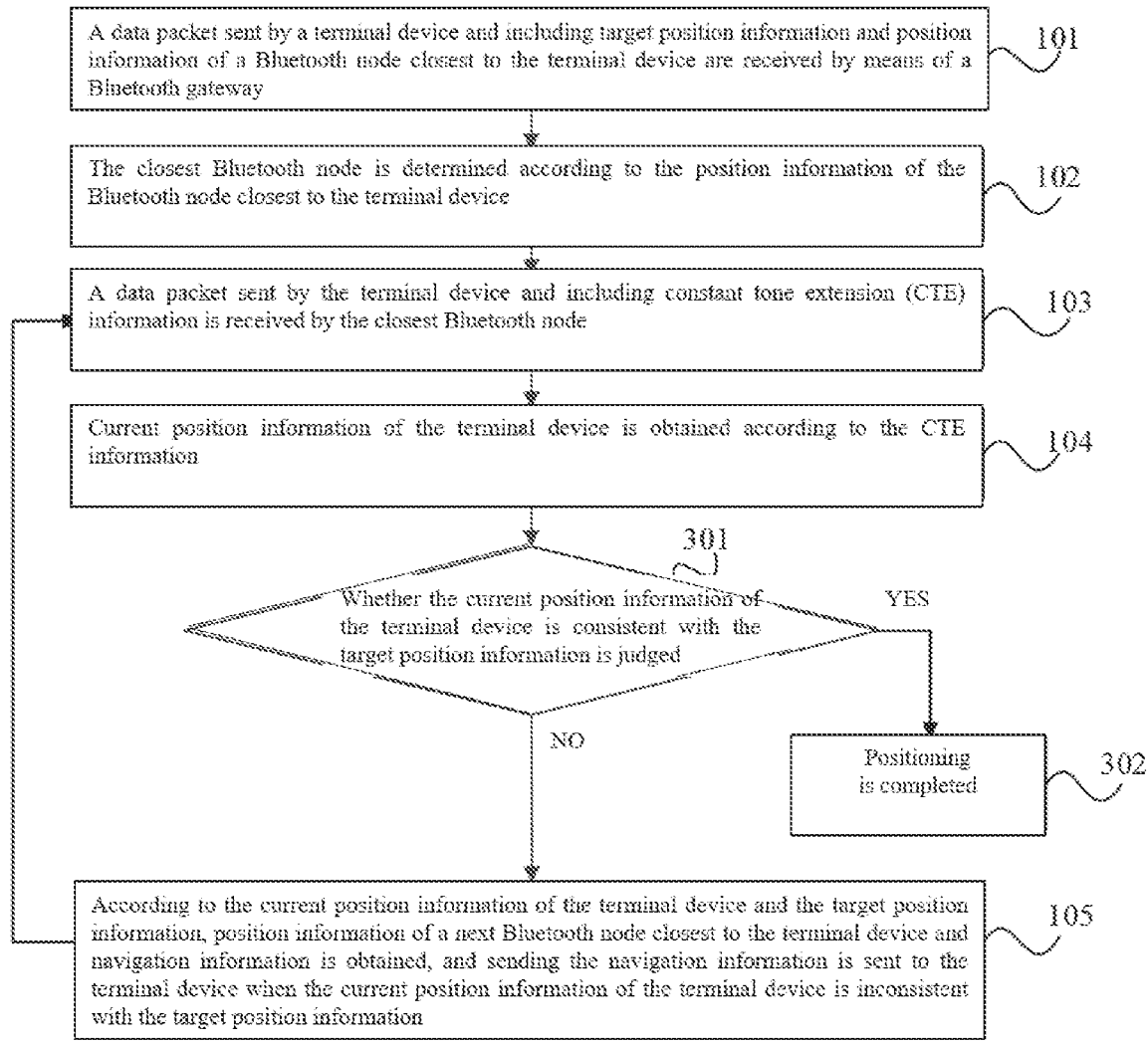
FIG. 3 is a flowchart of a positioning method provided by a third embodiment of the present application.

A third embodiment of the present application relates to a positioning method, which is substantially the same as the first embodiment, with the difference that, specifically, as shown in FIG. 3, before operation 105, the positioning method further includes:

At operation 301, whether the current position information of the terminal device is consistent with the target position information is judged.

In the embodiment, if the current position information is consistent with the target position information, operation 302 is performed, and if the current position information is inconsistent with the target position information, operation 105 is performed.

At operation 302, positioning is completed.

In the embodiment, the terminal device is moving all the time during the whole positioning process, i.e., positioning is real-time, the Bluetooth node needs to constantly obtain the current position information of the terminal device to judge whether it has arrived at the target position.

It should be noted that the above first to third embodiments of the present disclosure each relate to a positioning method, which is specifically applied to Bluetooth nodes for achieving the purpose of high-accuracy long-distance positioning.

Figure 4:
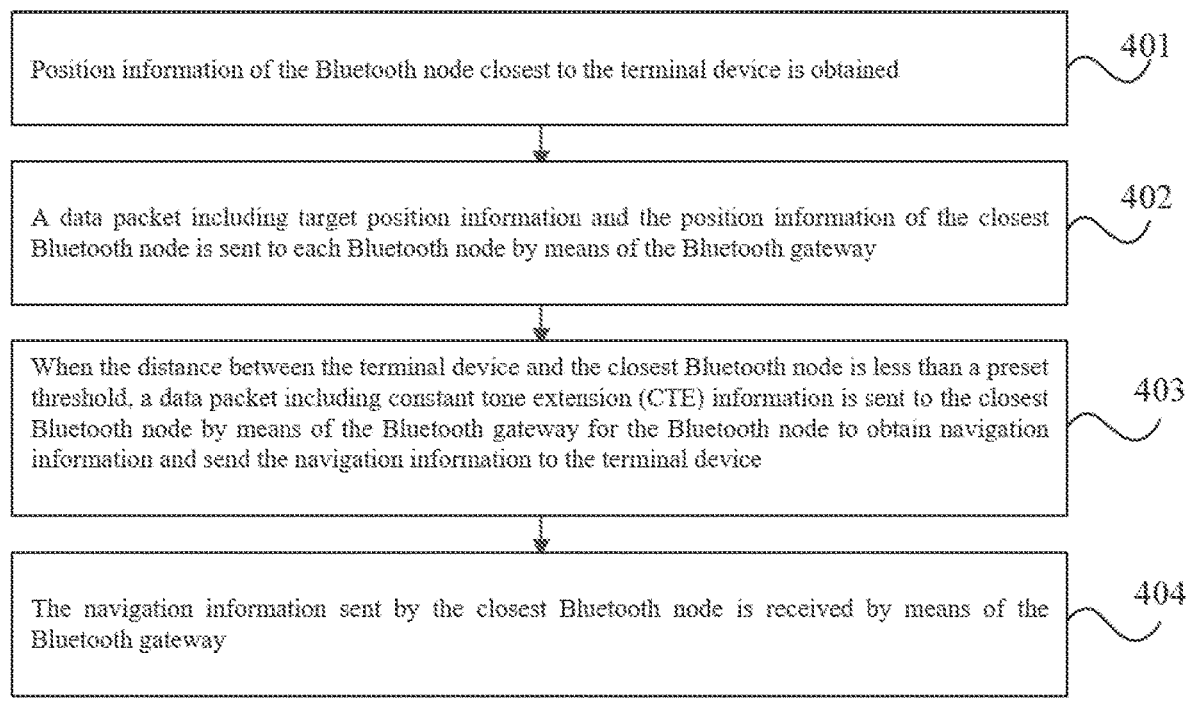
FIG. 4 is a flowchart of a positioning method provided by a fourth embodiment of the present application.

A fourth embodiment of the present application relates to a positioning method, which is applied to a terminal device. The terminal device is located in a Bluetooth mesh network, the Bluetooth mesh network includes a Bluetooth gateway and at least two Bluetooth nodes, the Bluetooth node stores position information of all Bluetooth nodes and information of distance between the Bluetooth nodes, and the specific flow is shown in FIG. 4:

At operation 401, position information of the Bluetooth node closest to the terminal device is obtained.

In the embodiment, after the position information of the closest Bluetooth node is obtained, the position information of the closest Bluetooth node may be broadcast to all Bluetooth nodes by the Bluetooth gateway, or the position information of the closest Bluetooth node may be sent to the closest Bluetooth node first, and then broadcast to all Bluetooth nodes by the closest Bluetooth node. In addition, the position information of the closest Bluetooth node may include information of distance between the Bluetooth node and the terminal device and an MAC address of the Bluetooth node.

At operation 402, a data packet including target position information and the position information of the closest Bluetooth node is sent to each Bluetooth node by means of the Bluetooth gateway.

In the embodiment, after the user terminal device enters the Bluetooth mesh network, target position information is sent to the Bluetooth nodes by means of the Bluetooth gateway, and of course, the target position information should be a known position within the Bluetooth mesh network. In addition, the sent data packet may include other information such as the MAC address of the terminal device in addition to the target position information.

In addition, an application (APP) is installed on the terminal device, and the structure of the Bluetooth mesh network and the position information of the Bluetooth nodes are preset in the APP, and the APP contains an indoor map engine of the positioned area. Of course, when the data packet including the target position information is sent, the APP can obtain the encrypted token from the server through the wireless network, the server address is built into the APP, and the encrypted token on the server is periodically updated, so as to avoid security problems. Correspondingly, the same server address is built into the Bluetooth gateway at the same time, and the encrypted token is obtained through the wireless network and is stored.

It should be noted that the APP encrypts the target position information to be found and positioned according to the encrypted token by using an irreversible algorithm such as SHA256 or MD5 to obtain encrypted sequence, and the encrypted sequence is stored in the APP. Correspondingly, the Bluetooth gateway encrypts the position information using the same algorithm to obtain an encrypted sequence, and in a subsequent step, it is necessary to judge whether the target position has been found by comparing whether the two encrypted sequences are the same. Of course, the above encryption algorithm is only a specific example, and any encryption method may be adopted to encrypt the target position information, and will not be described in detail herein.

At operation 403, when the distance between the terminal device and the closest Bluetooth node is less than a preset threshold, a data packet including constant tone extension (CTE) information is sent to the closest Bluetooth node by means of the Bluetooth gateway for the Bluetooth node to obtain navigation information and send the navigation information to the terminal device.

At operation 404, the navigation information sent by the closest Bluetooth node is received by means of the Bluetooth gateway.

In the embodiment, in the process of receiving, by means of the Bluetooth gateway, the message sent by the closest Bluetooth node, the Bluetooth gateway can identify the message and judge whether the message is sent by the closest Bluetooth node. Specifically, judgment is made by comparing the MAC address of the closest Bluetooth node stored in the Bluetooth gateway with the MAC address carried in the message.

According to the positioning method provided by the embodiment, the terminal device obtains the position information of the Bluetooth node closest to the terminal device, and sends the target position information and the position information of the closest Bluetooth node to the Bluetooth node, and when the distance between the terminal device and the closest Bluetooth node is less than the preset threshold, the terminal device sends the data packet including constant tone extension (CTE) information to the closest Bluetooth node for the Bluetooth node to obtain the navigation information. The terminal device realizes precise positioning and finding of the target position by continuously receiving navigation information during the moving process, while not being limited by the transmission distance of Bluetooth, and realizes positioning of a distant target. The terminal device can accurately position and find the target position by continuously receiving navigation information during the moving process, and is not limited by the transmission distance of Bluetooth, so that positioning of a long-distance target can be achieved.

Figure 5:
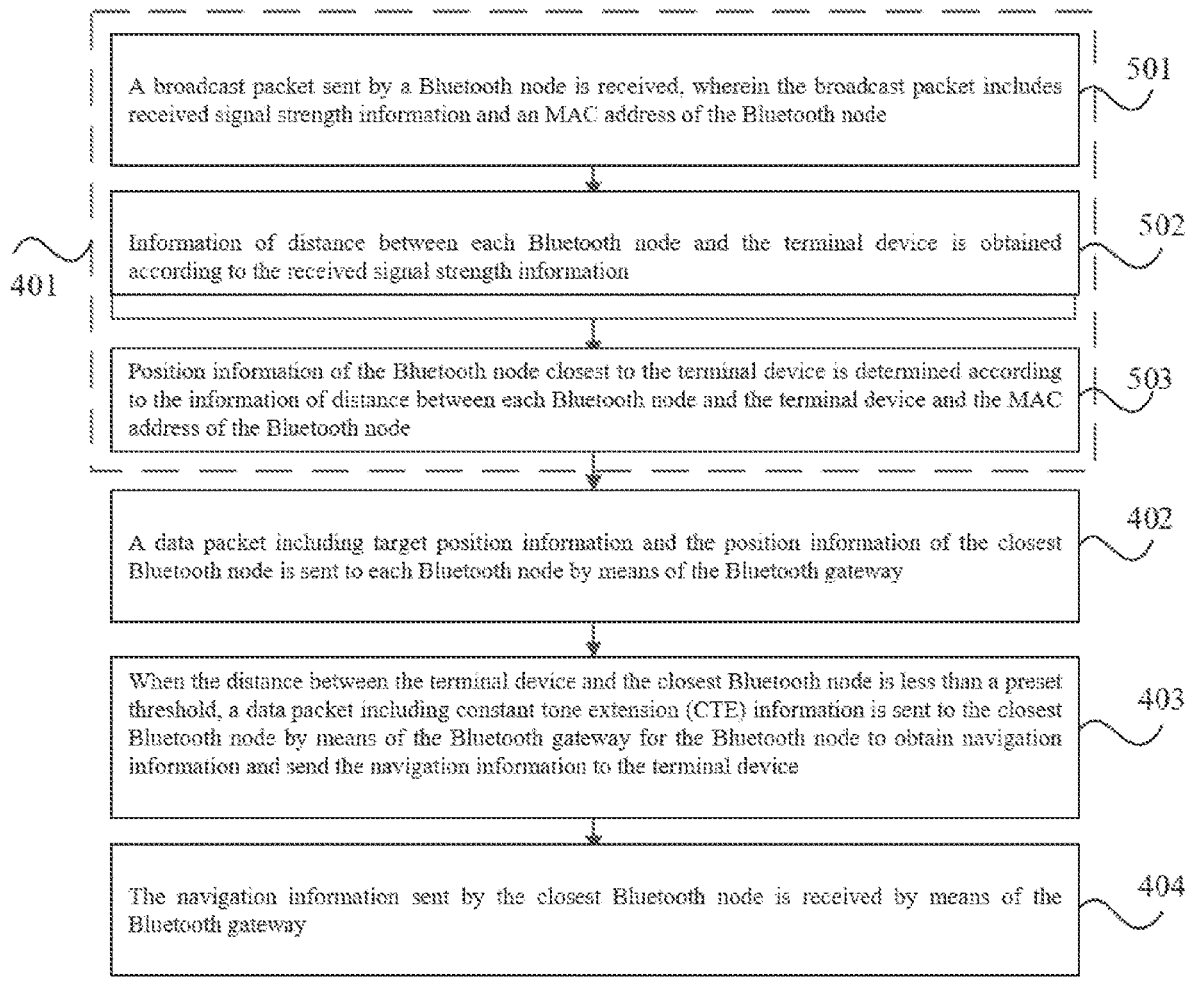
FIG. 5 is a flowchart of a positioning method provided by a fifth embodiment of the present application.

A fifth embodiment of the present application relates to a positioning method, which is substantially the same as the fourth embodiment, with the difference that, specifically, as shown in FIG. 5, operation 401 includes:

At operation 501, a broadcast packet sent by a Bluetooth node is received, wherein the broadcast packet includes received signal strength information and an MAC address of the Bluetooth node.

In the embodiment, the broadcast packet may include identity information of the packet, received signal strength information and the MAC address of the Bluetooth node. The identity information of the packet is configured to identify the source of the packet, that is, only packets from the Bluetooth mesh network can be received and identified. In general, the Bluetooth node will broadcast a beacon packet at regular intervals, from which the terminal device parses the received signal strength information and the MAC address of the Bluetooth node.

At operation 502, information of distance between each Bluetooth node and the terminal device is obtained according to the received signal strength information.

In the embodiment, the terminal device calculates the distance between the Bluetooth node corresponding to the received broadcast packet and the terminal device through the following formula:

$$d = 10^{\frac{\mathrm{abs}(RSSI) - A}{10 \times n}}$$

wherein d is the calculated distance in m, RSSI is the received signal strength in dB, A is the signal strength when the transmitting end and the receiving end are 1 meter apart, and n is the environmental attenuation factor. Wherein the values of A and n require empirical values obtained from multiple actual tests, and the initial values are set at empirical values. Of course, in the calculation process, for a Bluetooth node that has not received the broadcast packet, then the distance between the Bluetooth node and the terminal device can be assumed to be infinite by default.

In addition, before the information of distance between each Bluetooth node and the terminal device is obtained according to the received signal strength information, the received signal strength information may be subjected to de-noising and filtering processing, specifically, a median filtering algorithm or a Kalman filtering algorithm or other filtering algorithms may be adopted, here, only a specific example is given.

At operation 503, position information of the Bluetooth node closest to the terminal device is determined according to the information of distance between each Bluetooth node and the terminal device and the MAC address of the Bluetooth node.

According to the positioning method provided by the embodiment, on the basis of the fourth embodiment, by obtaining the received signal strength information and performing filtering processing and de-noising processing on the received signal strength information, the accuracy of the position calculation is improved, thereby further improving the accuracy of the positioning.

It should be understood that the fourth and fifth embodiments of the present disclosure relate to a positioning method, which is specifically applied to a terminal device, for achieving the purpose of high-accuracy long-distance positioning.

In addition, it should be understood that the steps of the above methods are divided only for the sake of clarity of description, during implementation, the steps may be merged into one step or some steps are split into multiple steps, and as long as the steps include the same logical relationship, the steps all fall within the protection scope of this patent; insignificant modifications added to or insignificant designs introduced into the algorithm or into the flow, as long as the core design of the algorithm and flow does not change, all within the protection scope of this patent.

Figure 6:
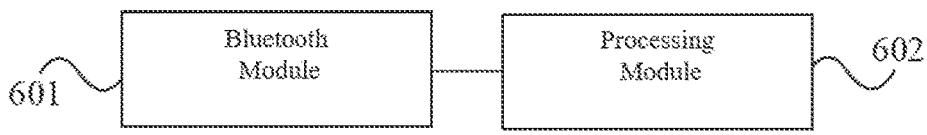
FIG. 6 is a structural schematic diagram of a positioning device according to a sixth embodiment of the present application.

A sixth embodiment of the present application relates to a positioning device, wherein the positioning device is located in a Bluetooth mesh network, positioning devices communicate via broadcast packets or data packets, as shown in FIG. 6, the positioning device includes:

a Bluetooth module 601, configured to receive a data packet sent by a terminal device and including target position information, position information of a closest Bluetooth node and a data packet including constant tone extension (CTE) information; and a processing module 602, configured to obtain current position information of the terminal device according to the CTE information, obtain position information of a next Bluetooth node closest to the terminal device and navigation information according to the current position information of the terminal device and the target position information, and send the navigation information to the Bluetooth module for the Bluetooth module 601 to send the navigation information to the terminal device.

A seventh embodiment of the present application relates to a Bluetooth gateway, wherein the Bluetooth gateway is located in a Bluetooth mesh network, and the Bluetooth mesh network includes at least two Bluetooth nodes;

the Bluetooth gateway is configured to receive a data packet sent by a terminal device and including target position information, position information of a closest Bluetooth node and a data packet including constant tone extension (CTE) information, and receive navigation information sent by the Bluetooth node;

the Bluetooth gateway is further configured to send a data packet including target position information, position information of a closest Bluetooth node and a data packet including constant tone extension (CTE) information to the Bluetooth node, and send navigation information to the terminal device.

In addition, it should be noted that the Bluetooth gateway is also configured to analyze whether the target position information is legitimate. Specifically, the legitimate target position information means that the target position information is located within the Bluetooth mesh network. Of course, it should be noted that the Bluetooth gateway is configured to implement information transmission between the terminal device and the Bluetooth node, and when the Bluetooth gateway needs to implement packet transmission with the APP on the terminal device, the Bluetooth gateway needs to have a module supporting Internet access.

It is worth mentioning that the modules referred to in this embodiment are all logical modules, and in practical applications, a logical unit may be a physical unit, a part of a physical unit, or a combination of a plurality of physical units. In addition, in order to highlight the innovative part of the present disclosure, units less closely related to solving the technical problems raised by the present disclosure are not introduced in this embodiment, but this does not indicate that there are no other units in this embodiment.

It will be understood by a person having ordinary skill in the art that the above-described embodiments are specific embodiments for implementing the present application, but in practical application, various changes in form and detail may be made therein without departing from the spirit and scope of the present application.

What is claimed is:

1. A positioning method, applied to a Bluetooth node in a Bluetooth mesh network, the Bluetooth mesh network comprising a Bluetooth gateway and at least two Bluetooth nodes, the Bluetooth node storing position information of all Bluetooth nodes and information of distance between the Bluetooth nodes, and the method comprising:

receiving, by means of the Bluetooth gateway, a data packet sent by a terminal device and comprising target position information, and position information of a Bluetooth node closest to the terminal device;

determining the closest Bluetooth node according to the position information of the Bluetooth node closest to the terminal device;

receiving, by the closest Bluetooth node, a data packet sent by the terminal device and comprising constant tone extension (CTE) information;

obtaining current position information of the terminal device according to the CTE information; and obtaining, according to the current position information of the terminal device and the target position information, position information of a next Bluetooth node closest to the terminal device and navigation information, and sending the navigation information to the terminal device when the current position information of the terminal device is inconsistent with the target position information.

2. The positioning method according to claim 1, wherein, the obtaining current position information of the terminal device according to the CTE information, comprises:

controlling different antennas in the Bluetooth node to be switched according to the CTE information;

obtaining a time difference of arrival of a broadcast packet sent by the terminal device at the different antennas; and obtaining current position information of the terminal device according to the time difference of arrival of the broadcast packet at the different antennas, wherein the current position information of the terminal device comprises distance information and orientation information of the terminal device relative to the closest Bluetooth node.

3. The positioning method according to claim 1, wherein, the CTE information comprises: an antenna switching time slot, a signal sampling time slot and information of an included angle between the terminal device and an antenna of the Bluetooth node.

4. The positioning method according to claim 1, wherein, the navigation information comprises: information of distance and information of orientation between a current position of the terminal device and a next Bluetooth node closest to the terminal device.

5. The positioning method according to claim 1, wherein before the obtaining, according to the current position information of the terminal device and the target position information, position information of a next Bluetooth node closest to the terminal device and navigation information, and sending the navigation information to the terminal device when the current position information of the terminal device is inconsistent with the target position information, the positioning method further comprises:

judging whether the current position information of the terminal device is consistent with the target position information, and completing positioning under the condition that the current position information of the terminal device is consistent with the target position information.

6. A positioning method, applied to a terminal device, the terminal device being located in a Bluetooth mesh network, the Bluetooth mesh network comprising a Bluetooth gateway and at least two Bluetooth nodes, the Bluetooth node storing position information of all Bluetooth nodes and information of distance between the Bluetooth nodes, and the method comprising:

obtaining position information of a Bluetooth node closest to the terminal device;

sending, by means of the Bluetooth gateway, a data packet comprising target position information and the position information of the closest Bluetooth node to each Bluetooth node;

sending, by means of the Bluetooth gateway, a data packet comprising constant tone extension (CTE) information to the closest Bluetooth node for the Bluetooth node to obtain navigation information and send the navigation information to the terminal device when a distance between the terminal device and the closest Bluetooth node is less than a preset threshold; and receiving, by means of the Bluetooth gateway, the navigation information sent by the closest Bluetooth node.

7. The positioning method according to claim 6, wherein, the obtaining position information of a Bluetooth node closest to the terminal device, comprises:

receiving a broadcast packet sent by the Bluetooth node, wherein the broadcast packet comprises received signal strength information and an MAC address of the Bluetooth node;

obtaining information of distance between the Bluetooth nodes and the terminal device according to the received signal strength information; and determining position information of the Bluetooth node closest to the terminal device according to the information of distance between the Bluetooth nodes and the terminal device and the MAC address of the Bluetooth node.

8. A Bluetooth gateway, the Bluetooth gateway being located in a Bluetooth mesh network, and the Bluetooth mesh network comprising at least two Bluetooth nodes;

the Bluetooth gateway being configured to receive a data packet sent by a terminal device and comprising target position information, position information of a closest Bluetooth node and a data packet comprising constant tone extension (CTE) information, and receive navigation information sent by the Bluetooth node;

the Bluetooth gateway being further configured to send a data packet comprising target position information, position information of a closest Bluetooth node and a data packet comprising constant tone extension (CTE) information to the Bluetooth node, and send navigation information to the terminal device.

9. The Bluetooth gateway according to claim 8, wherein, the Bluetooth gateway is further configured to analyze whether the target position information is legitimate.

10. A positioning device, wherein the positioning device is located in a Bluetooth mesh network, positioning devices communicate with each other via a broadcast packet or a data packet, and the positioning device comprises:

a Bluetooth module, configured to receive a data packet sent by a terminal device and comprising target position information, position information of a closest Bluetooth node and a data packet comprising constant tone extension (CTE) information; and a processing module, configured to obtain current position information of the terminal device according to the CTE information, and obtain, according to the current position information of the terminal device and the target position information, position information of a next Bluetooth node closest to the terminal device and navigation information, and send the navigation information to the terminal device when the current position information of the terminal device is inconsistent with the target position information.

11. The positioning method according to claim 2, wherein, the CTE information comprises: an antenna switching time slot, a signal sampling time slot and information of an included angle between the terminal device and an antenna of the Bluetooth node.

12. The positioning method according to claim 2, wherein, the navigation information comprises: information of distance and information of orientation between a current position of the terminal device and a next Bluetooth node closest to the terminal device.

13. The positioning method according to claim 3, wherein, the navigation information comprises: information of distance and information of orientation between a current position of the terminal device and a next Bluetooth node closest to the terminal device.

14. The positioning method according to claim 2, wherein before the obtaining, according to the current position information of the terminal device and the target position information, position information of a next Bluetooth node closest to the terminal device and navigation information, and sending the navigation information to the terminal device when the current position information of the terminal device is inconsistent with the target position information, the positioning method further comprises:

judging whether the current position information of the terminal device is consistent with the target position information, and completing positioning under the condition that the current position information of the terminal device is consistent with the target position information.

15. The positioning method according to claim 3, wherein before the obtaining, according to the current position information of the terminal device and the target position information, position information of a next Bluetooth node closest to the terminal device and navigation information, and sending the navigation information to the terminal device when the current position information of the terminal device is inconsistent with the target position information, the positioning method further comprises:

judging whether the current position information of the terminal device is consistent with the target position information, and completing positioning under the condition that the current position information of the terminal device is consistent with the target position information.

16. The positioning method according to claim 4, wherein before the obtaining, according to the current position information of the terminal device and the target position information, position information of a next Bluetooth node closest to the terminal device and navigation information, and sending the navigation information to the terminal device when the current position information of the terminal device is inconsistent with the target position information, the positioning method further comprises:

judging whether the current position information of the terminal device is consistent with the target position information, and completing positioning under the condition that the current position information of the terminal device is consistent with the target position information.

\* \* \* \* \*